W. H. SCRYMGOUR.
SPRING WHEEL FOR VEHICLES.
APPLICATION FILED SEPT. 30, 1907.
899,332.
Patented Sept. 22, 1908.
2 SHEETS—SHEET 2.
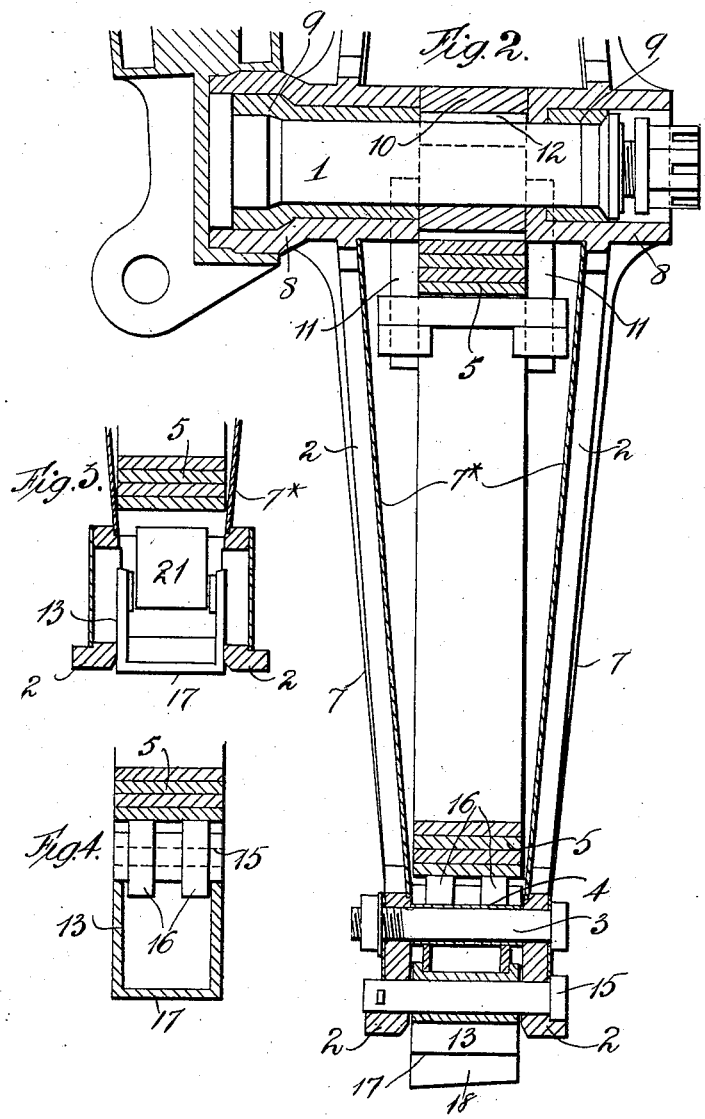

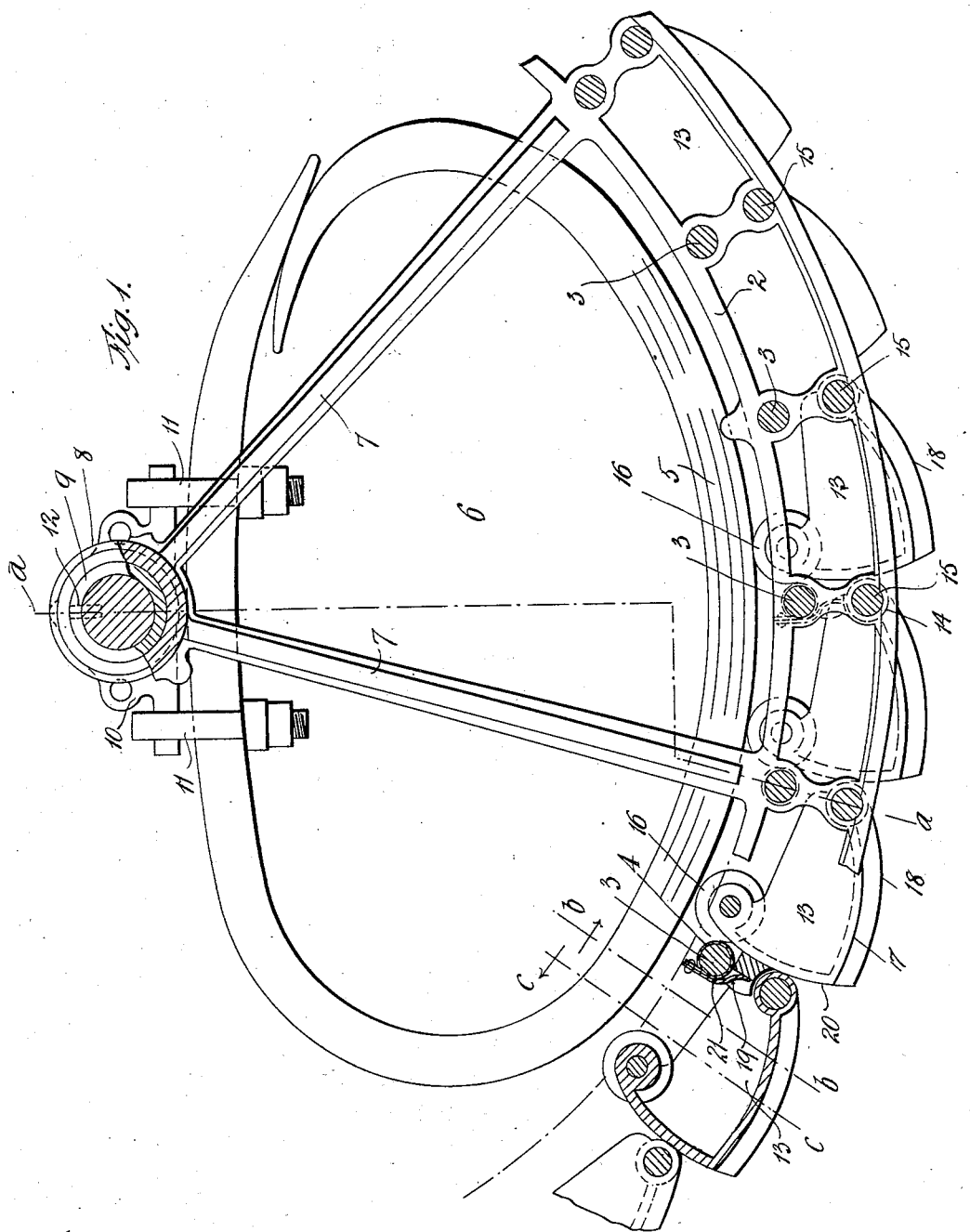

UNITED STATES PATENT OFFICE.

WILLIAM HARRINGTON SCRYMGOUR, OF LONDON, ENGLAND.

SPRING-WHEEL FOR VEHICLES.

No. 899,332.           Specification of Letters Patent.           Patented Sept. 22, 1908.

Application filed September 30, 1907. Serial No. 395,191.

*To all whom it may concern:*

Be it known that I, WILLIAM HARRINGTON SCRYMGOUR, a subject of the King of Great Britain and Ireland, and resident of 13 Lovell's Court, Paternoster Row, London, county of London, England, have invented certain new and useful Improvements in Spring-Wheels for Vehicles, of which the following is a specification.

This invention has for its object to so construct and arrange the wheel that the periphery thereof shall be capable of giving at any part where the same is in contact with the road surface and to return to its original shape in such a manner that the wheel will possess the same elasticity as one fitted with a pneumatic tire and that though strong enough to support any given load it will give a check, absorb and lessen the vibration transmitted to the axle by shocks set up by contact with the road surface. For this purpose the wheel consists of two disks nearly the diameter of the finished wheel bolted together near the peripheries and revolving on the axle in the usual manner. Mounted on the axle so as to be fast therewith, so as not to revolve and between the disk, is a block or shoe which carries an elliptical spring, the shorter axis of which is nearly equal to the radius of the disks and of a width sufficient to have clearance of said disks when the same are revolving round the spring which is made strong enough to carry any given load without appreciable deflection.

Between the disks and at the periphery thereof are fitted a number of blocks or shoes in such a manner that when in position they somewhat resemble the teeth of a ratchet wheel, but each block or shoe is detached and pivotally mounted by one end in the disks, the other end being free to swing so as to shut in between the disks.

The free ends of the blocks or shoes are provided with rollers which, when the wheel is in motion, are brought down one after another under the beforementioned elliptical spring so that for a fractional space of time the load is supported by the spring through each of the blocks or shoes in turn and always through one or more of them.

To retain oil or grease between the disks and to exclude dust the same are provided with any suitable arrangement of packing or paneling.

In order that the said invention may be the more readily understood reference is to had to the following description and accompanying drawings in which:—

Figures 1 and 2 are part sectional elevations, Fig. 2 being a section on line *a, a* Fig. 1. Figs. 3 and 4 sections on lines *b, b; c, c* respectively of Fig. 1.

Like numerals of reference indicate corresponding parts.

In said drawings 1 is the axle of suitable design, and 2, 2 the disks which are free to revolve on the same, held together by bolts 3 and distance pieces 4 near the periphery so as to run clear of the spring 5. The spaces 6 between the spokes 7 of the disks are packed or fitted with a panel or panels 7* so as to exclude dust and the like and retain oil or grease. The boxes 8 are provided with loose bushes 9 fitting the axle 1 so that the disks will revolve either on the axle or on the bushes.

The elliptical spring 5 which is preferably constructed of steel leaves in the ordinary manner is fixed to the block or shoe 10 by clips 11, said block or shoe 10 being fixed to the axle 1 by key 12 so that the spring 5 cannot revolve on the axle, while the disks freely revolve thereon.

To prevent the wheel coming off even if the key works loose the outer disk is provided with an annular stop working against the back of its bush 9.

Between the disks 2, 2 are fitted the shoes 13, so arranged that when together and in position they form a flexible tread or tire capable of yielding at any given number of points and where in contact with the road surface supported by spring 5. The shoes 13 are preferably formed hollow and triangular in shape pivoted at one end 14 to the disks 2 by bolts 15, the other end being provided with rollers 16—Figs. 1 and 4—adapted to engage with the under surface of the spring 5. The lower part 17 of each shoe is provided with a tread 18 of any suitable material, and further to exclude dust and assist in keeping in the oil or grease a packing or wiper 19 of brass or other suitable material to wipe on the front 20 of said block is kept in position by means of spring 21—Figs. 1 and 3—attached to the distance pieces 4.

Having now described my invention what I claim as new and desire to secure by Letters Patent of the United States is:—

1. In a vehicle wheel comprising disks mounted free to rotate on an axle and bolted together, the combination therewith of blocks or shoes pivotally mounted in said disks near the periphery thereof, an elliptical spring fixedly carried by said axle to be engaged with by the wheels of said block on the minor axis of said spring to cause said blocks to have engagement with the road surface for a fractional space of time to support the load.

2. In a vehicle wheel comprising disks mounted free to rotate on an axle and bolted together, the combination therewith of blocks or shoes pivotally mounted in said disks near the periphery thereof, wheels carried by said blocks or shoes, an elliptical spring fixedly carried by said axle to be engaged with by said wheels on the minor axis of said spring to cause said blocks to have engagement with the road surface for a fractional space of time and means such as packing or panels to exclude dust while retaining oil or grease.

3. In wheels built up of disks bolted together and freely mounted on the axle, an elliptical spring fixedly mounted on said axle and between the disks, the minor axis of said spring making contact with blocks or shoes carried by the disks during the revolution of the wheel to support the load through each of the blocks or shoes in turn and always through one or more of them.

In testimony whereof I have affixed my signature in presence of two witnesses.

WILLIAM HARRINGTON SCRYMGOUR.

Witnesses:
ROBT. HUNTER,
F. W. KING.